(12) United States Patent
Wolf et al.

(10) Patent No.: US 6,881,019 B2
(45) Date of Patent: *Apr. 19, 2005

(54) METHOD AND STRUCTURE FOR LOCKNUT WITH SUBSTANTIALLY RIGID LOCKING MEMBER

(75) Inventors: Theodore L. Wolf, Concord, OH (US); Alan R. Wolf, Painesville Township, OH (US); Hubert F. Renau, Walton Hills, OH (US)

(73) Assignee: The Dyson Corporation, Painesville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/298,119

(22) Filed: Nov. 15, 2002

(65) Prior Publication Data

US 2003/0165370 A1 Sep. 4, 2003

Related U.S. Application Data

(63) Continuation-in-part of application No. 10/090,283, filed on Mar. 4, 2002.

(51) Int. Cl.[7] ............................................. F16B 39/24
(52) U.S. Cl. ..................... 411/261; 411/305; 411/333
(58) Field of Search ..................... 411/333–335, 260, 411/261, 371.1, 302, 947, 930, 305, 306

(56) References Cited

U.S. PATENT DOCUMENTS

| | | | | |
|---|---|---|---|---|
| 1,016,746 A | * | 2/1912 | Herzog | 411/260 |
| 2,320,032 A | * | 5/1943 | Danforth | 411/303 |
| 2,370,201 A | * | 2/1945 | Siesel | 470/19 |
| 2,378,610 A | * | 6/1945 | Wesley | 411/302 |
| 2,385,851 A | * | 10/1945 | Swanstrom | 411/103 |
| 2,389,377 A | * | 11/1945 | Manning | 411/303 |
| 2,502,642 A | * | 4/1950 | Currlin | 411/303 |
| 3,004,574 A | * | 10/1961 | Flick | 411/301 |
| 3,316,952 A | * | 5/1967 | Hollinger | 411/301 |
| 3,938,571 A | | 2/1976 | Heighberger | 151/7 |
| 4,004,626 A | * | 1/1977 | Biblin et al. | 411/277 |
| 4,069,854 A | | 1/1978 | Heighberger | 151/21 C |

* cited by examiner

*Primary Examiner*—Flemming Saether
(74) *Attorney, Agent, or Firm*—Patrick J. Daugherty; Driggs, Lucas, Brubaker & Hogg Co., LPA

(57) ABSTRACT

A structure and method for a locknut with a substantially rigid locking member is provided. The locking nut has an elongated body relative to a comparable standard, non-locking nut. The elongated body allows the nut to provide a standard length of thread for engaging bolt members, while also defining a void for the receipt and retention of a removable and replaceable rigid locking member. In a preferred embodiment, the member-carrying void has a forged gear-shaped side-wall structure that substantially engages the locking member within the void while shipping or handling the lock nut, and also causes the member to rotate with the nut as the nut is rotated onto a bolt member, and off of the bolt when loosened. One of either of the bolt threads and locking insert deform responsive to the compressive forces, locking the nut onto the bolt.

2 Claims, 5 Drawing Sheets

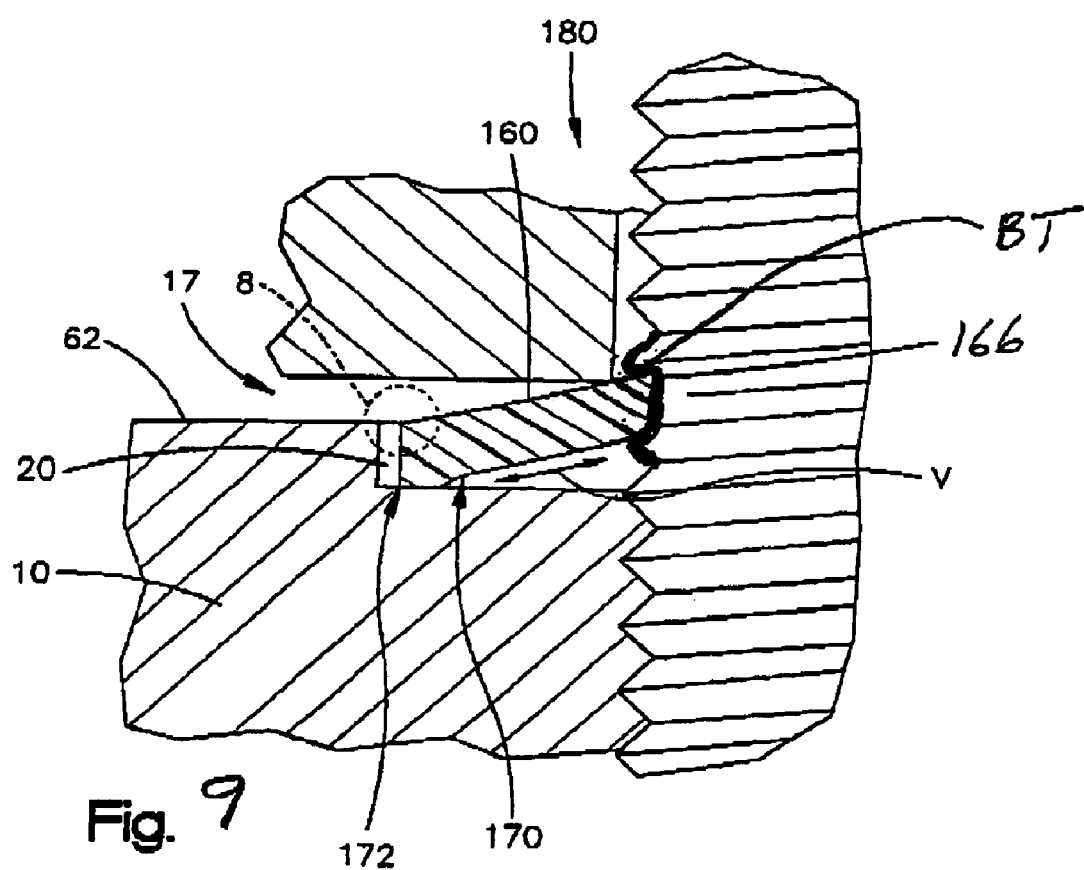

METHOD AND STRUCTURE FOR LOCKNUT WITH SUBSTANTIALLY RIGID LOCKING MEMBER

RELATED APPLICATION

This application is a continuation-in-part of application Ser. No. 10/090,283, filed Mar. 4, 2002 entitled "METHOD AND STRUCTURE FOR LOCKING NUT WITH DEFORMABLE MEMBER".

BACKGROUND OF THE INVENTION

Fastening objects together through methods incorporating threaded nut and bolt structures is well known. Typically, a male-threaded bolt projection from a first item is passed through an aperture in a second item, and a threaded nut is rotated onto the bolt projection until the bolt tightly compels the second item against the first item to form an assembled structure. Problems arise in maintaining the integrity of the resultant structure, as well as the individual components. For example, operational vibrations from use of the resultant structure may become translated into rotational movement of the nut relative to the bolt that loosens the bolt. Using a deformable insert component to provide a locking effect upon the threads of the nut and bolt assembly is well known in the art. One example is the deformable insert taught in related U.S. patent application Ser. No. 10/090,283 by Wolf et al. entitled "Method and Structure for Locking Nut With Deformable Member," of which this application is a continuation-in-part, and the entire disclosure of which is hereby incorporated into this application. Another deformable locking insert is taught by U.S. Pat. No. 3,938,571 to Heighberger for a "Nut with Sealing Insert." Alternatively, projecting elements have been formed upon a portion of a standard nut, which apply destructive frictional locking forces upon work-piece bolt threads. An example of this type of device is U.S. Pat. No. 4,069,854 to Heighberger for "Locknut with Segmental Locking Elements."

However, the prior art methods and structures have structural and functional disadvantages. Significantly, in the prior art, nut thread area is lost in order to allow for insertion of the locking element. For example, a conventional two-inch thread-nut has two inches of total body length and thread length along its central axis C. The prior art two-inch bolt with locking component of the aforementioned Heighberger "Nut with Sealing Insert" patent also has two inches of total body length, but formation of a mounting void for containing the locking component results in a corresponding reduction of thread length. Also, the formation of the rigid locking projections taught by the aforementioned Heighberger "Locknut with Segmental Locking Elements" patent also requires a sacrifice of nut thread length. This shortening of thread length results in a reduction in structural strength in the nut which, in turn, results in a higher rate of nut thread failure when compared to a nut with a conventional (and therefore longer) thread length. Although the reduction in strength is dependent upon other factors, such as type of assembly and nut materials, it has been found that, as a general rule, a 25% reduction in thread engagement length can result in a 25% reduction in performance strength of a nut.

Another disadvantage with structures and methods utilizing the prior art rigid locking projections is that the rigid projections are permanently distorted and damaged by the compressive interaction with the work-piece bolt threads. This distortion and damage precludes reuse of the prior art nut when it is removed and, therefore, the assembly cannot be disassembled and reassembled. This type of prior art nut is only useful for a single use or permanent installation, and is not available for uses that may require disassembly and re-assembly.

A further disadvantage of prior art removable locking members is that a structural retaining element must physically and firmly retain each member within a member-carrying void during shipping and transport of the locknut; otherwise, the member may become separated and lost. Similarly, a retaining structure is also needed to hold the member in place within the member-carrying area of the locknut while the nut is being rotated about a threaded bolt member, and importantly during removal of the nut from the bolt. Prior art nuts, such as the aforementioned Heighberger "Nut with Sealing Insert", utilized a machine-knurled edge to "grip" the member during transport, application and removal. However, knurl patterns formed by machining techniques have limited knurl element height, width and depth dimensions and, consequently, limited member retaining capabilities. The member often becomes separated and may be lost during shipping. More importantly, the "gripping" abilities of the prior art machine-knurled patterns are limited and insufficient to impart the frictional forces required to rotate and remove an applied locking insert from a bolt as the nut is rotated off of a bolt. Consequently, a user must find another mechanical means to engage and remove the deformed member from the bolt, resulting in greatly increased time for removal and disassembly.

Other prior art nuts utilize a cap member element, which is formed over a portion of the top surface of the locking member and holds the member within a carrying void, to retain the member during transport, removal and disassembly. An example of such a prior art nut is the ESNA® NU locknut. The ESNA cap member also exerts frictional forces upon the surface of the member to help compel it to rotate about a threaded bolt as the nut is rotated about the bolt. It is readily apparent that such a structure requires an additional sacrifice of effective thread length by consuming corresponding nut body material for the formation of the cap member. Also, the presence of this fixed and rigid cap structure makes replacement of an individual locking member impossible and, where the member has been degraded or failed, the entire nut must be discarded and replaced.

Additionally, it is the compressive interaction of the projections, member-carrying void and the bolt threads that causes the deformable ESNA member to impart locking characteristics to the ESNA locknut. As a result, the deformable member cannot freely rotate about the bolt threads, but instead must deform as it travels about the bolt. This deformation results in a great deal of frictional force that must be overcome as the ESNA nut is threaded onto or off of the bolt. Similarly, the member must deform and becomes structurally altered immediately upon application of the nut onto a bolt.

Furthermore, the frictional force exerted upon the bolt threads by the ESNA-type locking member is limited to a constant value resulting from the compressive forces exerted upon the member through the cap/void wall/bolt thread interaction. This frictional force value reaches a maximum value once the bolt threads engage the entire thread-engaging inner surface of the deformable member. It is apparent that this value will not be increased by further tightening of the nut upon either the bolt or upon a work-piece disposed about the bolt, since this tightening will not increase the compressive forces imparted to the member by the cap/void wall/bolt thread interaction. Moreover, as the deformable member travels along the bolt threads, frictional abrasion from the bolt threads degrades the deformable member. Therefore, the maximum frictional force value imparted by the deformable member upon the bolt threads decreases every time the nut is tightened or loosened about a bolt member. Eventually, the member will be degraded beyond a point of meaningful frictional engagement with the bolt threads and, since the ESNA nut structure does not provide for replacement of the deformable member, the entire nut and member assembly must be discarded and replaced. Therefore, the prior art ESNA-type nut is not preferred for applications requiring a large travel distance along the bolt threads for application, nor for those applications requiring disassembly and re-assembly of the nut/bolt structure.

Another desired characteristic is a vibration dampening function. Prior art nuts limit their vibration-dampening characteristics to absorbing vibrations between the thread bodies of the nut and bolt, while allowing direct contact between lock nut and work-piece surfaces. This type of dampening may be insufficient in some applications, and additional vibration dampening devices may be required between nuts and work-pieces, such as washers, in order to ensure that the prior art locknuts remain in a fixed position when the assembly is subject to operational vibrations.

Deformable locking inserts may also deform too readily responsive to application forces. Locking forces then otherwise applied to the work-piece bolt threads are dissipated by the deformation of the soft deformable locking insert material, limiting the amount of forces imparted to the assembly by the locking insert.

What is needed is a locking nut that has the thread engagement strength of a comparable standard non-locking nut. What is also needed is a substantially rigid locking member that can apply great locking forces to the assembly. The nut must also retain the locking member during shipping and transport, and during rotation about a bolt and during removal of the nut from an assembly. What is also desired is a locking member that freely travels over bolt member threads until the member reaches a locking engagement point, thereby enabling rapid and easy application of the locknut and avoiding degradation of the member during assembly. It is also desired that the locknut provide vibration-dampening qualities beyond the thread engagement areas and including the nut-to-work-piece interface, in order to provide adequate locking and vibration dampening and resisting characteristics. Where the locknut locking members and work-piece bolt threads have similar hardness characteristics, such that one of the locking member and bolt threads may be damaged by a locking interaction, one must be able to select locking member hardness to protect either the locking member or the threads. And lastly, it is desired that the a user may vary the amount of locking force required to lock the locking nut in position, and thereby also vary the force imparted to the final assembly by the locking member.

SUMMARY OF THE INVENTION

A structure and method for a locknut with a substantially rigid locking member is provided. The locking nut has an elongated body relative to a comparable standard, non-locking nut. The elongated body allows the nut to provide a standard length of thread for engaging bolt members, while also defining a void for the receipt and retention of a removable and replaceable rigid locking member. In a preferred embodiment, the member-carrying void has a forged gear-shaped side-wall structure that substantially engages the locking member within the void while shipping or handling the locknut, and also causes the member to rotate with the nut as the nut is rotated onto a bolt member, and off of the bolt when loosened. One of either of the bolt threads and locking insert deform responsive to the compressive forces, locking the nut onto the bolt.

BRIEF DESCRIPTION OF THE DRAWINGS

FIG. 9 is another assembly according to the present invention wherein the locking member deforms the bolt threads.

DETAILED DESCRIPTION OF THE INVENTION

Figure 1:
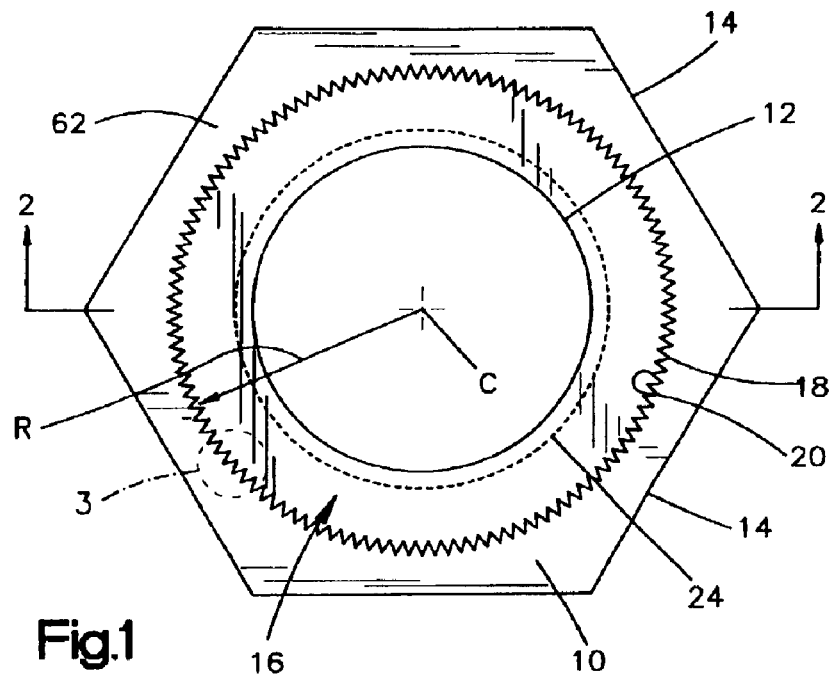
FIG. 1 is a top plan view of a locknut according to the present invention.
Figure 2:
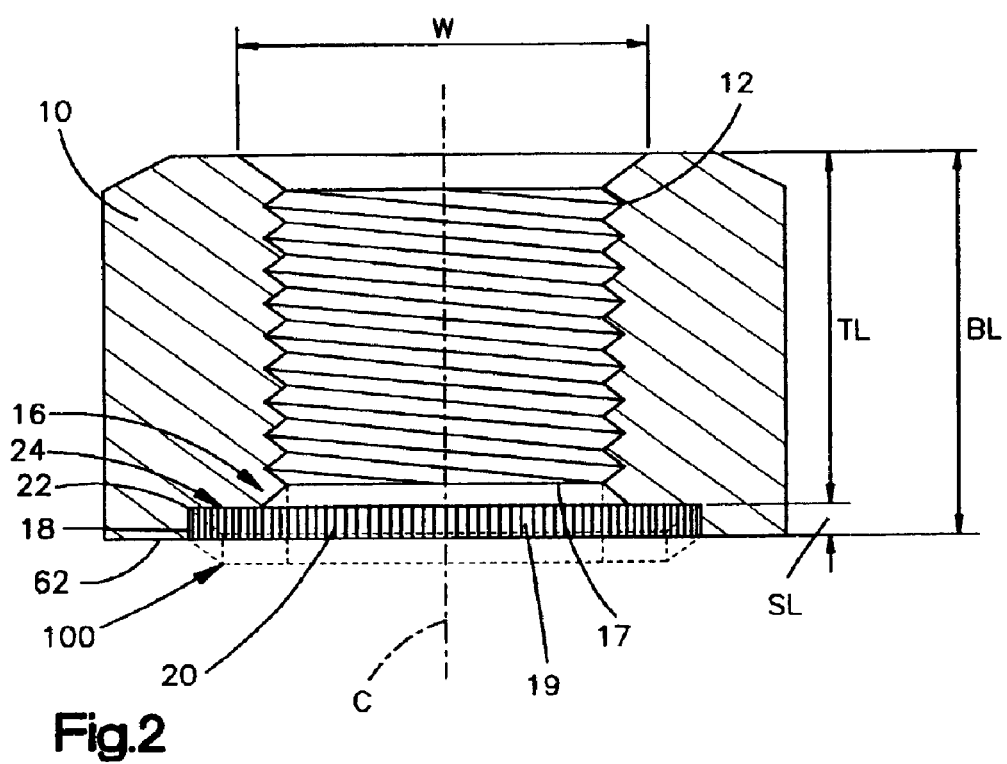
FIG. 2 is a side sectional view, taken about on the line 2—2 of FIG. 1, of the lock nut of FIG. 1, and incorporating a sectional view of an inserted locking member according to the present invention.

Referring to FIG. 1, a top-end view of an embodiment of a lock nut 10 with threads 12 according to the present invention is illustrated. FIG. 2 is a side sectional view, taken about on the line 2—2 of FIG. 1, of the locknut of FIG. 1. As is conventional, the nut 10 has six exterior side-walls 14 for engagement with tools for rotational application about a mating threaded bolt work-piece (not shown), although it is readily apparent that other side-wall configurations are suitable, and the invention is not limited to locknuts with six exterior sidewalls. Between the exterior side-wall 14 and the threads 12, a locking member-carrying aperture 16 is defined. The aperture 16 is a locking member carrying region bounded by a splined circular interior sidewall element 18 and a generally flat circular actuating wall 24, and extending into space above the top surface 62 of the locknut 10. The splined side-wall 18 is defined by a series of vertical splines 20, each spline 20 preferably about parallel to a central axis C of the nut 10 and located along a radius R about the axis C, wherein the threads 12 and the actuating wall 24 are also defined radially about the same axis C. The actuating wall 24 is defined between the bottom ends 22 of the splines 20 and the threads 12.

Although the present embodiment of the spline 20 is parallel with the central axis, this alignment is not required and alternative alignments of the splines will be apparent to one skilled in the art. For example, the splines may taper inwardly (not shown) with respect to the central axis as one views the splines from the top surface. This configuration would enable easier insertion or removal of a rigid member from the locknut of the present invention. Alternatively, the splines may taper outwardly (not shown) with respect to the central axis as one views the splines from the top surface. This latter configuration would facilitate retention of a rigid member, compressed and flowed according to the present invention within the member-carrying aperture when the locknut is loosened and removed from a work-piece bolt.

Referring now to FIG. 2, a side sectional view of the nut 10 of FIG. 1 is provided, incorporating a sectional view of an inserted locking member 100 according to the present invention. Although, in the present embodiment, the aperture 16 has a flat circular shape aligned generally parallel to the radius R, other wall shapes may be practiced by the present invention, and the invention is not limited to the specific shapes illustrated. For an example, an alternative actuating wall may have a conical shape, such as that illustrated and discussed in the related and previously incorporated U.S. application to Wolf et al. for "Method and Structure for Locking Nut With Deformable Member United States Patent Application," Ser. No. 10/090,283. Similarly, alternative splines (not shown) may have an orientation other than parallel to the central axis C, as described above. Accordingly, the embodiment of the invention described is exemplary of the invention, and the invention is not limited to the embodiment illustrated in the figures.

A conventional non-locking nut typically has a thread body length corresponding to the thread size. Accordingly, a "two-inch" thread-nut has about two inches of thread length along its central axis. Prior art locknuts (not shown) are typically formed from standard non-locknuts by creating a locking insert void within the existing nut body, and the formation of the void necessarily results in a corresponding loss of thread length. This shortening of thread length results in a reduction in structural strength in the nut which, in turn, results in a higher rate of nut thread failure when compared to a non-locking nut with a conventional (and therefore longer) thread length. Although the reduction in strength is dependent upon other factors, such as type of assembly and nut materials, it has been found that, as a general rule, a 25% reduction in thread engagement length can result in a 25% reduction in performance strength of a nut.

Referring again to FIG. 2, one important advantage of the present invention is that the total thread length TL corresponds to the thread size W, as in a conventional non-locking nut. This is accomplished by forming the locknut 10 from a nut body with a greater body length than a conventional prior art locknut or non-locking nut. Aperture 16 is formed within a portion of the locknut 10 beyond the thread body length TL and having an aperture length dimension defined by the spline length dimension SL, which results in an overall locknut length BL that is the sum of the thread length TL dimension and the spline length dimension SL. Accordingly, the locknut 10 has about the same thread strength as a conventional non-lock nut, and greater thread strength than prior art locknuts, which have a diminished thread length dimension.

Figure 3:
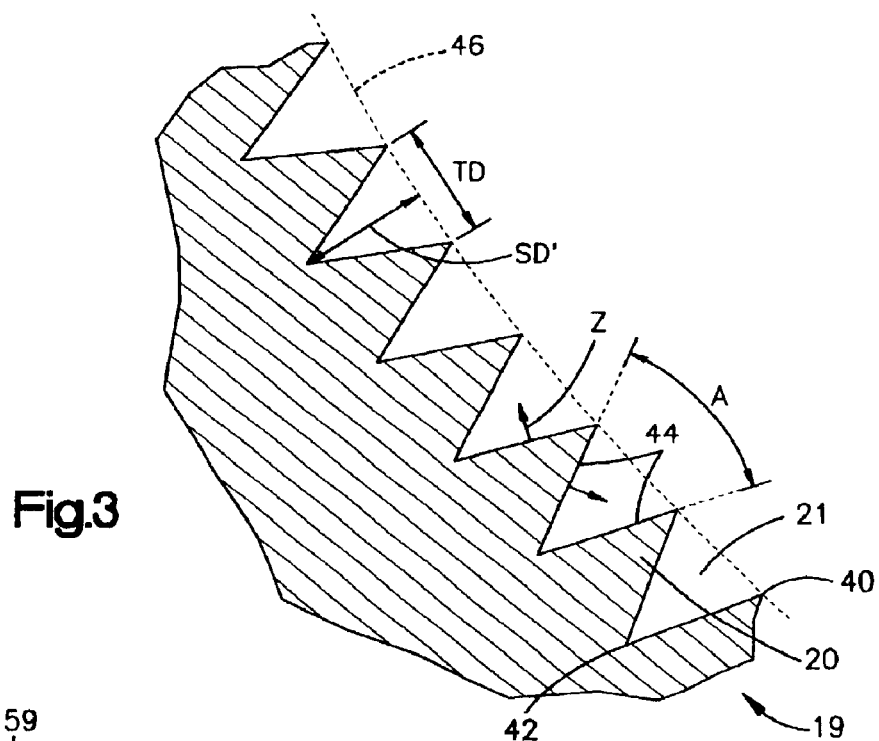
FIG. 3 is a top fragmentary detail plan view of the lock nut of FIG. 1 illustrating spline elements according to the present invention.

As illustrated in FIG. 2, the splines 20 have a length dimension SL. Referring now to FIG. 3, a partial view of the splined aperture wall 19 is provided. The splines 20 shown in FIG. 3 have a preferred gear shape and array structure, although other shapes and array structures may be practiced with the present invention. The geared splines 20 have a depth dimension SD between each spline tip 40 and spline base 42. The splines 20 also define an angle A between adjacent spline walls 44, and further define spline voids 21 between adjacent spline walls 44. The preferred depth dimension SD and angle A dimensions will vary depending upon the size of the locknut 10, the application of the locknut 10 and the type of locking member 100 utilized with the locknut 10.

Although the spline 20 embodiment described thus is of a pointed triangular shape with uniform dimensions SD and SL and wall angles A, and is distributed uniformly around the entire circumference of the splined aperture wall 19, the invention is not limited to this configuration. For example, some applications of the invention may not require that the entire circumference of the splined aperture wall 19 be comprised of splines. Instead, a limited distribution of splines may be spaced about smooth aperture wall portions (not shown). Alternatively, splines may be grouped in discrete clusters (not shown) separated by smooth aperture wall portions. The exact number of splines 20 or distribution of splines 20 is not important to the invention. What is important is that a sufficient number of splines 20 are provided and arranged to firmly engage the locking member 100 so that it turns in unison with the locknut 10 while being rotationally applied to or removed from a work-piece bolt.

Figure 4:
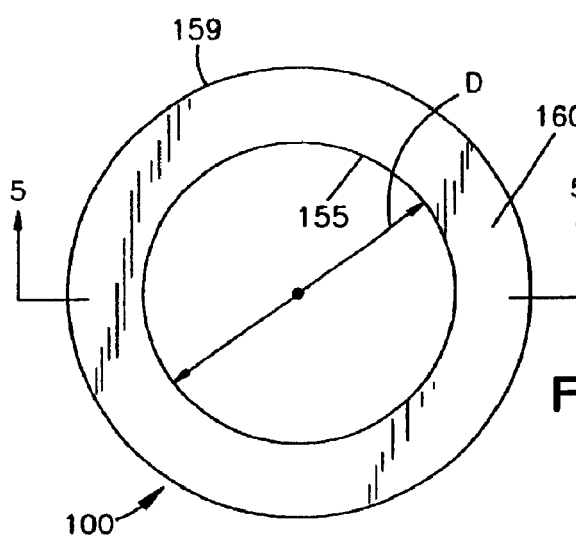
FIG. 4 is a top plan view of a locking member according to the present invention.
Figure 5:
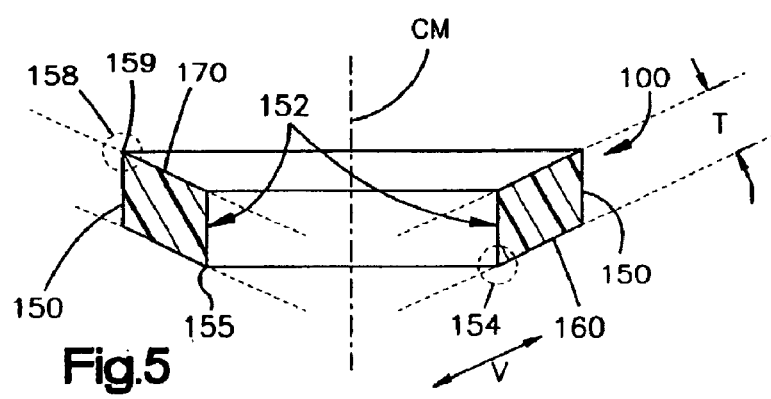
FIG. 5 is a sectional view of the locking member of FIGS. 3 and 4, taken about on the line 5—5 of FIG. 4.

Referring now to FIGS. 4 and 5, a locking member 100 according to the present invention is shown. In the present embodiment, the inner surface 152 and outer surface 150 of the member 100 are of a cylindrical shape, shaped about a common central axis CM. The member 100 also has a top flat conical surface 160 and a bottom conical surface 170 aligned generally parallel to the top surface 160, spaced by a thickness T from each other. The top surface 160 intersects the inner surface 152 to form an upper intersection region 154 with an upper circular rim edge 155. The bottom surface 170 intersects the outer surface 150 to form a bottom intersection region 158 with a bottom circular rim edge 159.

The shapes of the surfaces 150, 152, 160 and 170, and their structural relations with each other, described thus far are not the only shapes and relationships available to practice the present invention, but they are preferred to practice the invention with an efficiency and economy of member 100 structural materials. What is important is that the member 100 has an inherent structural integrity, wherein the member 100 will deform enough to engage the splines 20, yet substantially resist compressive forces to provide a locking structure with the work-piece bolt threads and, in some embodiments, an insulating structure.

In one embodiment of the present invention, the locknut 10 and locking member 100 generally have the same physical characteristics as to chemical composition and relative material hardness. For applications wherein the work-piece bolt threads are metallic, the locknut 10 and locking member 100 are also preferably metallic. Typical materials for the locknut 10 and locking member 100 are carbon or "low alloy" steel compositions. Exemplary compositions are AISI 4140, a through-hardening chromium-molybdenum medium carbon steel; or LESCALLOY 4340 VAC-ARC, low-alloy steel that can be heat treated to high strength levels. For high-temperature applications, such as those above 500 degrees Fahrenheit (° F.), Incoloy®, a series of corrosion resistant alloys of nickel, iron and chromium; and Inconel®, a series of corrosion resistant alloys of nickel and chromium, are appropriate. In other applications, the locknut 10 and locking member 100 may be fabricated from "300 series" stainless steel alloys. Typical applications utilizing the present invention are railway structure connections and mining industry applications, although other applications will be readily apparent to one skilled in the art.

An advantage of the present invention is that the metallic member 100 may be fabricated to a selected specific hardness relative to the work-piece or locknut 10 threads and interface surfaces by the use of heat-heating. For example, where superior locking characteristics are required, and disassembly and re-use of a work-piece bolt is not required, the locking member may be heat-treated to a hardness equivalent to or greater than that of the work-piece bolt threads. The resultant "locked" assembly structure will greatly resist loosening, but at the cost of damaging or deforming the work-piece bolt threads. This characteristic is particularly suitable for single-use applications requiring strong locking characteristics. Accordingly, referring now to FIG. 9 an examplary application is shown where the locking member 100 is heat-treated to a hardness less than that of the locknut 10 but greater than that of the bolt threads BT. As the lock nut 10 is tightened about the bolt threads BT, the top rim 155 and top intersection area 154 are engaged by the work-piece surface EB and bolt threads ET. Further tightening of the locknut 10 about the bolt threads BT results in downward forces applied to the locking member 100 by the work-piece surface EB and bolt threads BT. Since downward motion of the locking member 100 is prevented by the splines 20 engaging the outer surface 150, and the locknut actuating surface 24 engaging the bottom rim 159, these downward forces are translated into compressive forces that act upon the bolt threads BT, responsively deforming them as illustrated. The compressive forces are aligned along vector V generally aligned with the body of the locking member 100, in this case about parallel to the conical upper and lower surfaces 160 and 170.

In contrast, where damage to the work-piece bolt threads is to be avoided, the locking member 100 may be heat-treated to a hardness less than that of the threads, therefore ensuring that the locking member 100 instead is deformed in the "locked" assembly. In this fashion, the hardness of the locking member 100 can be selected to deform or fail under normal application forces before causing damage to work-piece threads. This also enables an assembly utilizing the present invention to be disassembled, and the locknut 10 and work-piece bolt threads to be reused, with either the originally used locking member 100 or a replacement locking member 100. This can be accomplished with the present invention, wherein an installed locking member 100 will form a locking assembly requiring a "break-away torque" force of about 90% of the installation torque force. Break-away torque may be defined as the force required for the first infinitesimal movement of the assembly toward loosening.

Similarly, the hardness of the locking member 100 may be configured relative to the locknut 10. In many applications, the locking member 100 and locknut 10 will be heat-treated to generally the same hardness. Where this is the case, it is the geometry of the splines 20 that ensures that the locking member 100 deforms enough to engage the splines and rotate with the locknut during application and removal of the locknut from work-piece bolts. Alternatively, the locking member 100 may be less hard than the locknut 10, which will enable greater deformity by the locking member 100 about the splines 20.

It is preferred that the splines 20 firmly engage the member 100 and thereby hold the member 100 within the member-carrying aperture 16 during shipping, application of the locknut 10 to a work-piece bolt, and removal from the workpiece. Accordingly, the tips 40 of the present spline 20 embodiment are pointed, and define a tip array diameter 46 about the central axis C which is less than that of the outer member diameter 148. The member 100 is pressed into the aperture 16, preferably with a "medium press-fit," causing the tips 40 to direct compressive forces normal to and toward the center axis C against the cylindrical outer surface 150. The pointed shape of the spline edges 40 overcomes the resistance of the outer surface 150, and the splines 20 thus impinge into and deform the outer surface 150. This is true even where the locking member 100 has a hardness similar to that of the locknut 10. It is important that the member 100 has an inherent resilience that causes the outer surface 150 to impart reactive expansion forces against the impinging tips 40. The interaction of the tips 40 and the outer surface 150 results in expansion and frictional forces that retain the member 100 within the aperture 16 while the nut 10 is being shipped, transported or otherwise handled.

Figure 6:
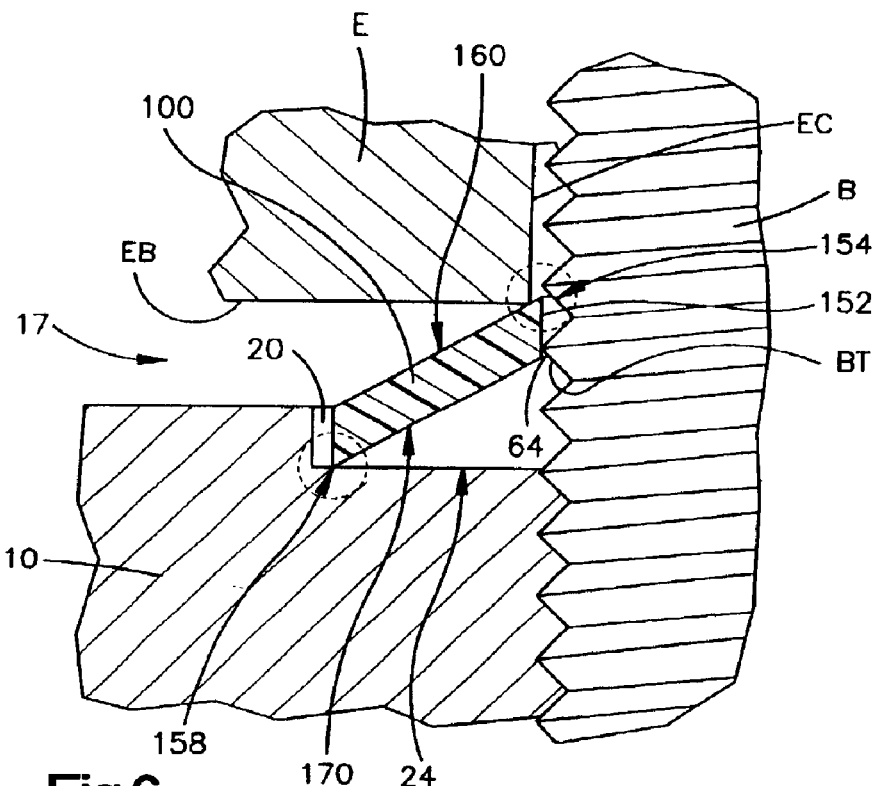
FIG. 6 is an enlarged side sectional fragmentary view of an assembly of a locknut and locking member according to the present invention, a work-piece threaded bolt and an engagement work-piece.

It is preferred that the member axis CM is aligned with the nut central axis C when the member 100 is inserted into the aperture 16. FIG. 6 illustrates an assembly of the locknut 10, the locking member 100, a work-piece threaded bolt B and an engagement work-piece E. It is also preferred that the inner surface 152 defines an inner aperture diameter D greater than the thread size W of the locknut 10, thereby creating a space 64 between the inner surface 152 and the work-piece bolt threads BT. Therefore, when the locknut 10 and inserted member 100 are rotated about the bolt B, the member 100 will not engage the bolt threads BT. Moreover, the member 100 will pass over the bolt threads BT without frictional interaction or rotative restraint imparted to the member 100 and locknut 10 assembly by engagement of the member 100 with the bolt threads BT. This is important in preventing degradation or wear effects upon the member inner surface 152 by application of the member 100 and locknut 10 assembly to the bolt B.

Figure 7:
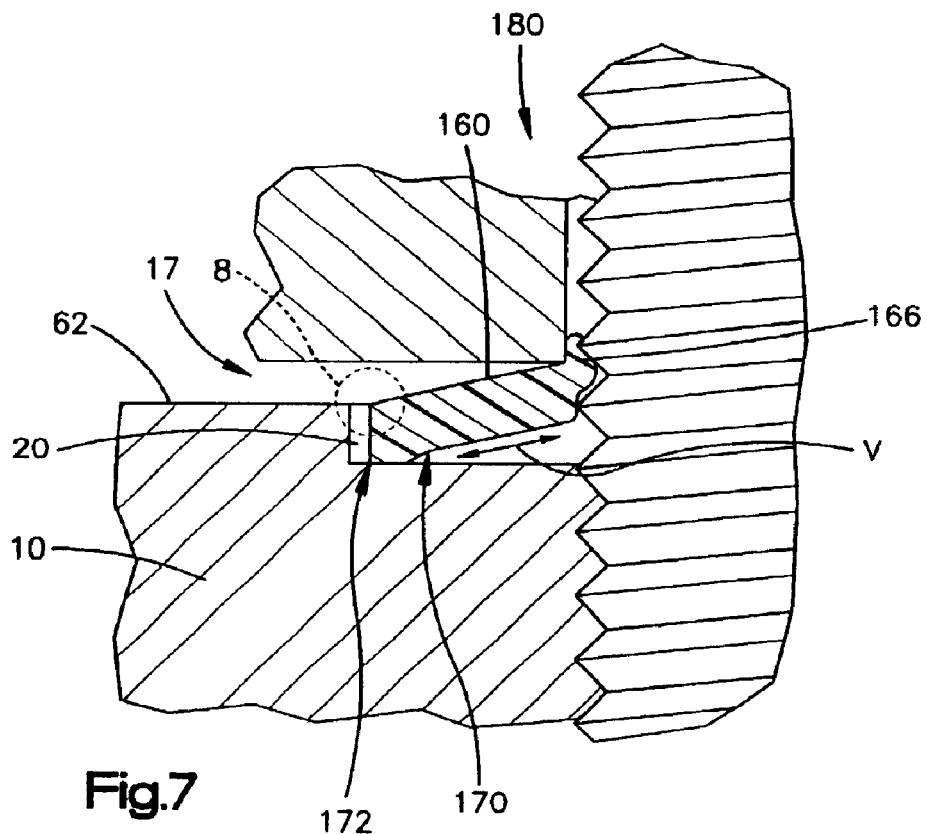
FIG. 7 is another view of the assembly of FIG. 6 wherein the locking member is compressed by the bolt and locknut.

Referring now to FIG. 7, an exemplary application is shown where the locking member 100 is heat-treated to a hardness less than that of the locknut 10 or the bolt threads BT As the locknut 10 is tightened about the bolt threads BT, the top rim 155 and top intersection area 154 are engaged by the work-piece surface EB and bolt threads BT. Further tightening of the locknut 10 about the bolt threads BT results in downward forces applied to the locking member 100 by the work-piece surface EB and bolt threads BT. Since downward motion of the locking member 100 is prevented by the splines 20 engaging the outer surface 150, and the locknut actuating surface 24 engaging the bottom rim 159, these downward forces are translated into compressive forces that act upon the body of the locking member 100. The compressive forces are aligned along vector V generally aligned with the body of the locking member 100, in this case about parallel to the conical upper and lower surfaces 160 and 170.

Figure 8:
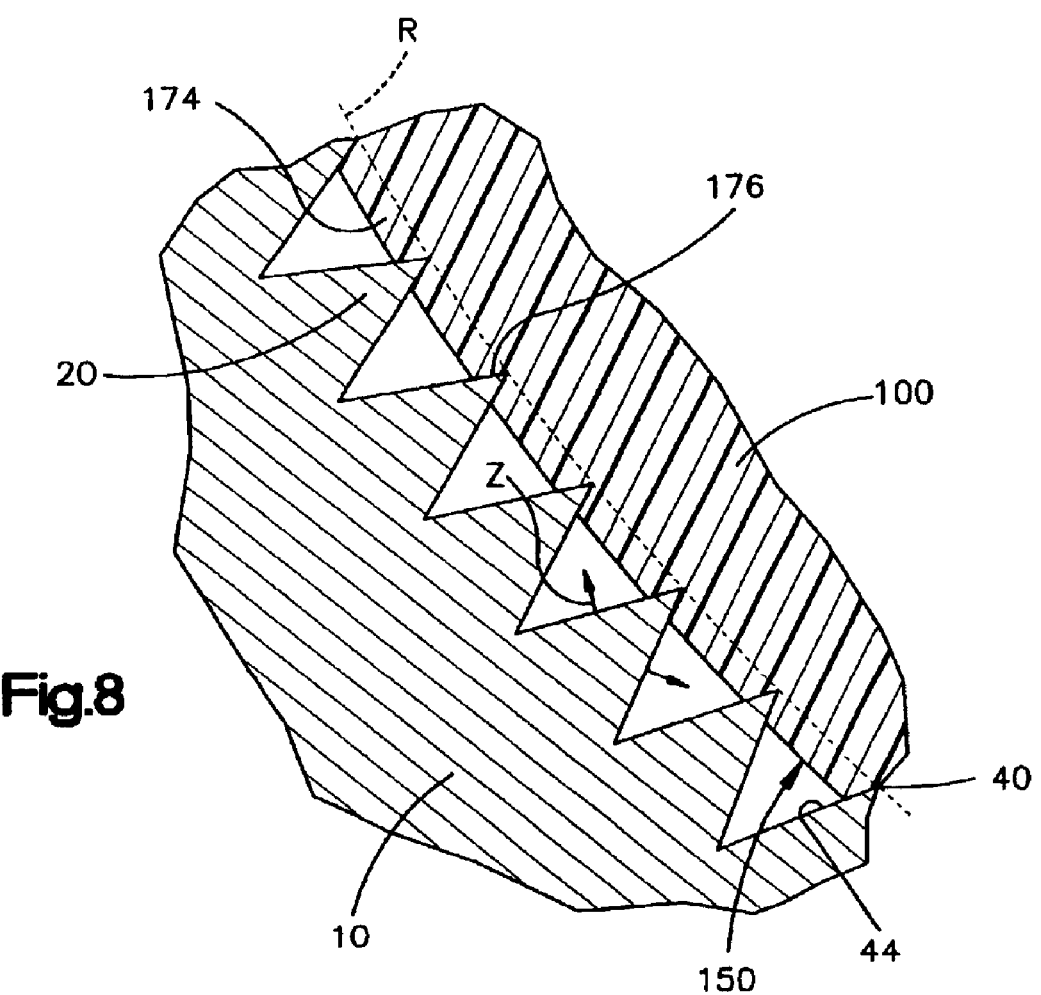
FIG. 8 is a top fragmentary detail plan view of an engagement of the locking member by the locknut splines as illustrated in FIG. 7.

As the compressive forces are increased by further tightening of the locknut 10, the locking member 100 deforms responsive to the increasing forces. Since the locking member 100 is substantially rigid, it will resist deformation and, therefore, will deform first at points wherein the compressive force overwhelms the structural resistance to deformation. As shown in FIG. 8, deformation occurs along the outer surface 150. The pointed edge structures 40 of the splines 20 piece the outer surface 150 and drive into the locking member 100, creating spline engagement regions 174 between the outer surface 150 and the inner spline edge radius R and within the spline voids 21. Beyond the edges 40, the triangular splines 20 widen and, since progressively more of the locking member 100 must deform to allow the spline 20 to pierce further into the locking member 100 body, at some point the rigid locking member 100 will resist the compression forces and no longer deform.

Deformation also generally occurs at the top and bottom intersection areas 154 and 158. This is enabled by the generally pointed shapes of the top and bottom intersection areas 154 and 158 and rim 155 and 159, since there is less cross-sectional thickness T of the locking member 100 relative to the vector V at these areas and, therefore, less material mass and structure to resist the compression forces along vector V. Accordingly, the top rim 155 and portions of the intersection areas 154 deform and cold-flow into the spaces 64 and about the bolt threads BT. Similarly, the bottom rim 159 and portions of the bottom intersection areas 158 deform and cold-flow into spline voids 21. As the thickness T progressively increases along the body of the locking member 100 away from the rims 155 and 159 and along vector V, the locking member 100 progressively increases its resistance to deformation, and the forces along vector V can no longer deform the locking member 100. At this point, when no more deformation occurs, the locknut 10 can no longer travel along the bolt threads BT and the locknut 10 "locks" into place. The inherent rigidity of the locking member 100 as a whole resists compression and deformation beyond those regions interfacing and deforming about the splines 20 and bolt threads BT. In some embodiments, the locking member 100 will also deform at the intersection areas 154 and 158 sufficiently to engage the work-piece surfaces EB and EC and locknut actuating wall 24.

In the present embodiment, the locking member 100 stops further tightening of the locknut 10 about the bolt B and "locks" the nut 10 in place before the work-piece lower surface EB comes into contact with the top locknut surface 64. Thus, the locking member 100 body as a whole functions as an insulating member between the workpiece E and the locknut 10. The locking member 100 is less rigid than either the locknut 10 or the bolt threads BT and, therefore, will have a vibration dampening effect, absorbing and dissipating vibration forces that might otherwise cause loosening of the locknut and work-piece assembly 180.

The compressed locking member 100 thereby forms thread-engaging regions 166 and spline engaging regions 172 and 174. The thread-engaging regions 166 impart a resilient expansion force against the bolt threads BT and a corresponding frictional force that resists movement of the bolt threads BT relative to the member 100. The same resilient expansion forces are imparted by the compressed member 100 against the locknut 10 actuating wall 24, the splines 20, and the locknut threads 12 and, therefore, the same corresponding frictional force that resists movement of the locknut 10 relative to the member 100. Additionally, portions 176 of the spline walls 44 exert normal force vectors Z against engagement portions 174 of the member 100 flowed into the spline voids 21. Accordingly, the locking member 100 provides locking forces that "lock" the locknut 10 into place relative to the bolt B and work-piece E.

It is preferred that the locking member 100 have resilient characteristics, in order for the member 100 to relax slightly when the nut 10 is loosened. By relaxing, the frictional forces imparted by the member 100 against the bolt threads BT are reduced sufficiently to allow the member 100 to move relative to the bolt threads BT as the locknut 10 is loosened about the bolt B. Although the frictional forces exerted against the bolt threads BT by the member 100 are reduced, the portions 174 of the member 100 that flowed into the spline voids 21 are still firmly engaged by the spline walls 44 and, accordingly, the member 100 is compelled by the splines 20 to rotate with the locknut 10 as the locknut 10 is loosened about the bolt B. The greater the elastic memory and resiliency of the member 100, the greater the ability of the member 16 to be reused in further applications.

The expansion forces exerted by the locking member 100 may be increased by further tightening the locknut 10 about the bolt B, which increases the compressive forces acting upon the member 100 by the constraining and deforming elements and, therefore, the reactive resistance forces by the member 100. Some of this force will be translated into additional member 100 deformation, but the rest will be translated into locking forces exerted by the locking member 100.

In some applications (not shown), the lower work-piece surface EB may come into contact with the upper locknut surface 62, effectively eliminating the airspace region 17. This may happen where the differential between the locking member 100 and the bolt threads BT hardness is selected to enable one or both to deform until the lower work-piece surface EB contacts the upper locknut surface 62, or where the dimensions of the locking member 100 are selected to allow this after only minor deformation. One skilled in the art may readily select the relative hardness according to the present invention to achieve the desired results.

Another important feature of the present invention is that the locking member 100 may be formed to rotate and remain engaged with the locknut 10 when the locknut 10 is loosened and removed from the bolt B. This enables the rapid removal of the member 100 with the locknut 10 and, accordingly, rapid disassembly of the member 100 and locknut 10 from the work-piece assembly. In contrast, prior art locking inserts typically remain engaged and secured about the bolt and work-piece interface when the prior art locknut is removed and, thus, require the additional step of removing the separated locking structures.

As discussed in the background of the invention material, prior art nuts, such as the aforementioned Heighberger "Nut with Sealing Insert", utilize a machine-knurled edge to "grip" the member during transport, application and removal. However, knurl patterns formed by machining techniques have limited maximum knurl element height, width and depth dimensions, due to the problems inherent in machining patterns within the relatively small member-carrying voids. Only a relatively small portion of the knurling tool can fit within the void and, accordingly, only small-dimensioned knurls can be formed without damaging the prior art locknut. Most importantly, a knurl applied through a machining means has a limited depth within an insert carrying void, limiting the prior art knurl pattern to only that portion of the insert carrying void near the surface of the void. Consequently, the "gripping" abilities of a machine-knurled pattern are limited and insufficient to impart the frictional forces required to rotate and remove the deformed member from a bolt as the nut is rotated off of a bolt.

What is new in the present invention is forming of substantial member-engaging elements by a forging process. The present invention can be practiced with either hot or cold forging techniques. What is important is that member-engaging elements of a substantial depth and height are formed, so that the locking member cold-flows about the member-engaging elements and engages them substantially. Therefore, when a locknut according to the present invention is removed from a bolt and/or work-piece, the member remains substantially engaged by the locknut and is removed along with it.

Referring again to FIG. 2, the spines 20 have a substantial height SL. The height SL is determined by the size of the locknut 10 and the size of the insert member 100. For a two-inch locknut according to the present invention, an exemplary height SL is about three-sixteenth of an inch. For a half-inch locknut, a spline height SL of about one-sixteenth of an inch is preferred. The splines 20 define the circular interior sidewall element 18 and, accordingly, it is preferred that the height of the circular interior sidewall element 18 is about the same as the spline height SL.

Prior art knurl patterns are generally of a shallow surface depth, due to the limitations of machining technology. The forged gear-shaped splines 20, according to the present invention shown in FIG. 3, have substantial triangular shaped spline voids 21 defined by substantial spline depth SD and tip-to-tip TD dimensions. The pitch, angle A and spline height SL values enabled by the forging process according to the present invention are substantially greater than those attainable by prior art knurling processes. It is preferable that the angle A has a value selected from the range of about 60 degrees to about 120 degrees, and that the pitch of the spline tips 40 per inch is a value selected from the range of about 6 to about 24. A preferred exemplary two-inch locknut according to the present invention has an angle A value of about ninety degrees, and a spline tip 40 pitch of about 14. However, preferred values will change based upon the size of the locknut; for example, for locknuts larger than two-and-one-half inches, a preferred pitch for the locking insert 100 is about 10. For locknuts below one-inch in thread diameter, it is preferred that cold-forging processes are used to form the splines. For locknuts above one-inch in thread diameter, it is preferred that hot-forging processes are used.

It is also well known in the arts that structures formed by forging have a superior integrity to those structures formed by machining. The act of machining a knurl pattern creates knurl structures by deforming the nut body. In contrast, forming the splines 20 through a forging process results in material being compressed into the desired shape by a stamping action. This results in an increased material density in the forged spline and actuating wall areas, resulting in a corresponding increased structural integrity of the splines 20 as compared to prior art knurl structures.

While preferred embodiments of the invention have been described herein, variations in the design may be made, and such variations may be apparent to those skilled in the art of making tools, as well as to those skilled in other arts. The materials identified above are by no means the only materials suitable for the manufacture of the tool, and substitute materials will be readily apparent to one skilled in the art. The scope of the invention, therefore, is only to be limited by the following claims.

What is claimed is:

1. A locknut assembly comprising:
   (a) a locknut body heat-treated to a first hardness with a central bolt-receiving void formed about a central axis, the void having an upper end and a lower threaded body length;
   (b) the lower threaded body length having a plurality of internal threads with a common thread diameter defined from the central axis, the threads disposed along a body length dimension about equal to the thread diameter;
   (c) an aperture formed at the locknut upper top end, the aperture defined by an array of forged splines, each spline having a first and a second spline wall intersecting at an engagement edge, the engagement edges disposed about the central axis on an engagement edge diameter greater than the thread diameter;
   (d) a plurality of spline voids each defined between a first sidewall of one of the splines and a second sidewall of an adjacent spline; and
   (e) a locking member heat-treated to a second hardness and having a top bolt thread engaging region and a cylindrical outer surface, the outer surface defined along an outer surface diameter larger than the spline engagement edge diameter, wherein the locking member is inserted into said aperture, the outer surface is engaged and deformed by the spline engagement edges to form spline engagement regions configured to retain the locking member with in the aperture;

wherein the locking member outer surface is further configured to further deform and flow into the spline voids upon compressive engagement with a work-piece and to remain engaged by the splines and rotate with the locknut when the locknut is loosened about the work-piece bolt;

wherein the locking member thread engagement region is configured to engage work-piece threads having a third hardness responsive to said compressive engagement, one of the member thread engagement region and the work-piece threads deforming responsive to said compressive engagement and thereby locking the locknut into a fixed position relative to the work-piece threads; and wherein the locking member second hardness is greater than the work-piece threads third hardness, and the work-piece threads deform responsive to said compressive engagement.

2. A method for locking a nut onto a bolt, comprising the steps of:
   (a) forming a locknut body with a top surface and a bolt-receiving void defined about a central axis having upper and lower ends;
   (b) forging an aperture at the locknut void upper top end, the aperture defined by an array of forged splines, each spline having first and second spline walls intersecting at an engagement edge, the engagement edges disposed about the central axis on an engagement edge diameter, a plurality of spline voids further defined between a first sidewall of one of the splines and a second sidewall of an adjacent spline;
   (c) internally threading the locknut void lower end with a plurality of internal threads having a common thread diameter defined from the central axis along and less than the spline engagement edge diameter, the threads further disposed along a thread body length dimension about equal to the thread diameter;
   (d) hardening the locknut to a first hardness;
   (e) forming a locking member with a cylindrical outer surface defined along an outer surface diameter larger than the spline engagement edge diameter, and a top work-piece engagement region;
   (f) hardening the locking member to a second hardness;
   (g) forcibly inserting the locking member into said aperture;
   (h) responsive to said insertion, the spline engagement edges impinging the locking member outer surface;
   (i) the spline engagement edges forming spline engagement regions on the locking member outer surface responsive to said impingement;
   (j) the spline engagement region and spline edges and walls cooperatively interfacing to retain the locking member within the aperture;
   (k) threading the locknut threaded body length onto a work-piece bolt having a plurality of common threads hardened to a third hardness and corresponding to the locknut threads, the work-piece threads third hardness lesser than the locking member second hardness, until the locking member top work-piece engagement region compressively engages a work-piece surface;

(l) further tightening the locknut about the bolt thereby compressing the locking member between the splines and the work-piece engagement surface and bolt threads;

(m) the locking member outer surface deforming and cold-flowing about the splines and into the spline voids responsive to said compressive force sufficient to remain engaged by the splines and rotate with the locknut if the locknut is subsequently loosened about the work-piece bolt; and (n) the work-piece bolt threads deforming responsive to said compressive force and thereby locking the locknut into a fixed position relative to the work-piece threads.

* * * * *

UNITED STATES PATENT AND TRADEMARK OFFICE
CERTIFICATE OF CORRECTION

PATENT NO. : 6,881,019 B2
DATED : April 19, 2005
INVENTOR(S) : Theodore Wolf et al.

It is certified that error appears in the above-identified patent and that said Letters Patent is hereby corrected as shown below:

Column 7,
Line 13, change "ET" to -- BT --.

Signed and Sealed this

Sixteenth Day of August, 2005

JON W. DUDAS
*Director of the United States Patent and Trademark Office*